Figure 5:
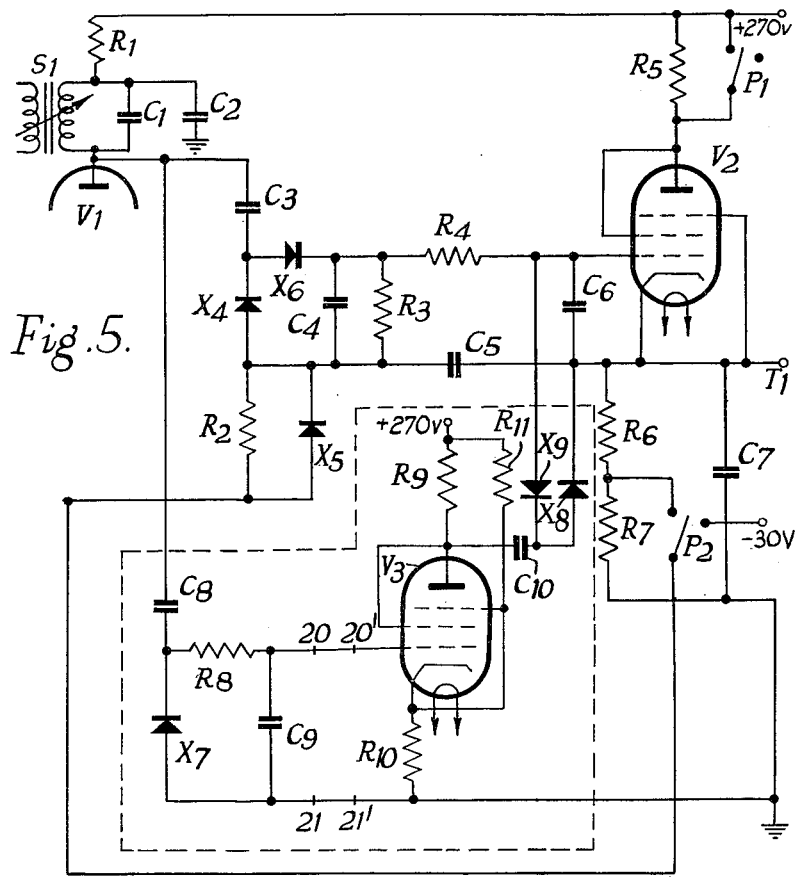

July 16, 1963  S. C. SPARLING ETAL  3,098,210
ECHO RANGING WITH REFERENCE TO BOUNDARY CONDITIONS
Filed April 26, 1957  4 Sheets-Sheet 1
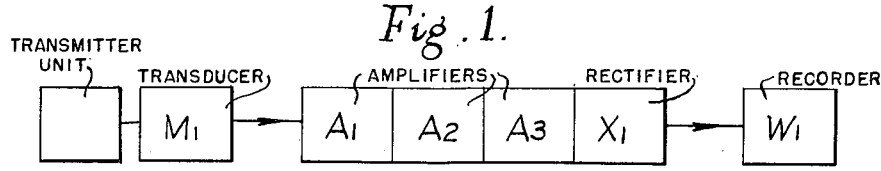
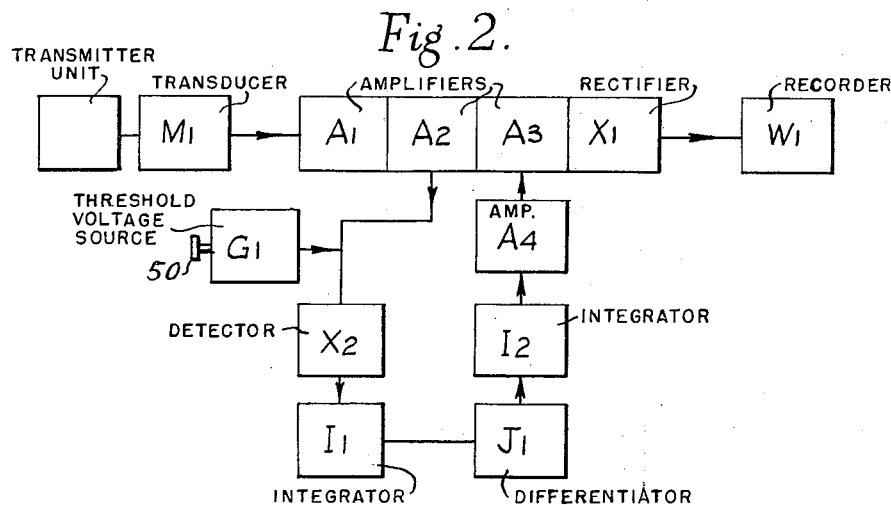
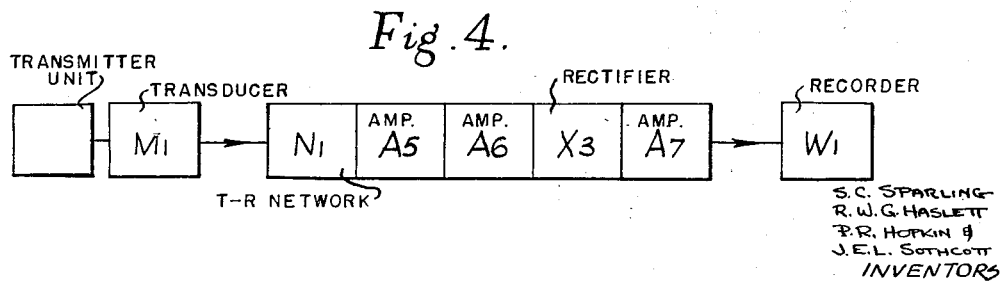
S.C. SPARLING
R.W.G. HASLETT
P.R. HOPKIN &
J.E.L. SOTHCOTT
INVENTORS
BY Moore & Hall
ATTORNEYS

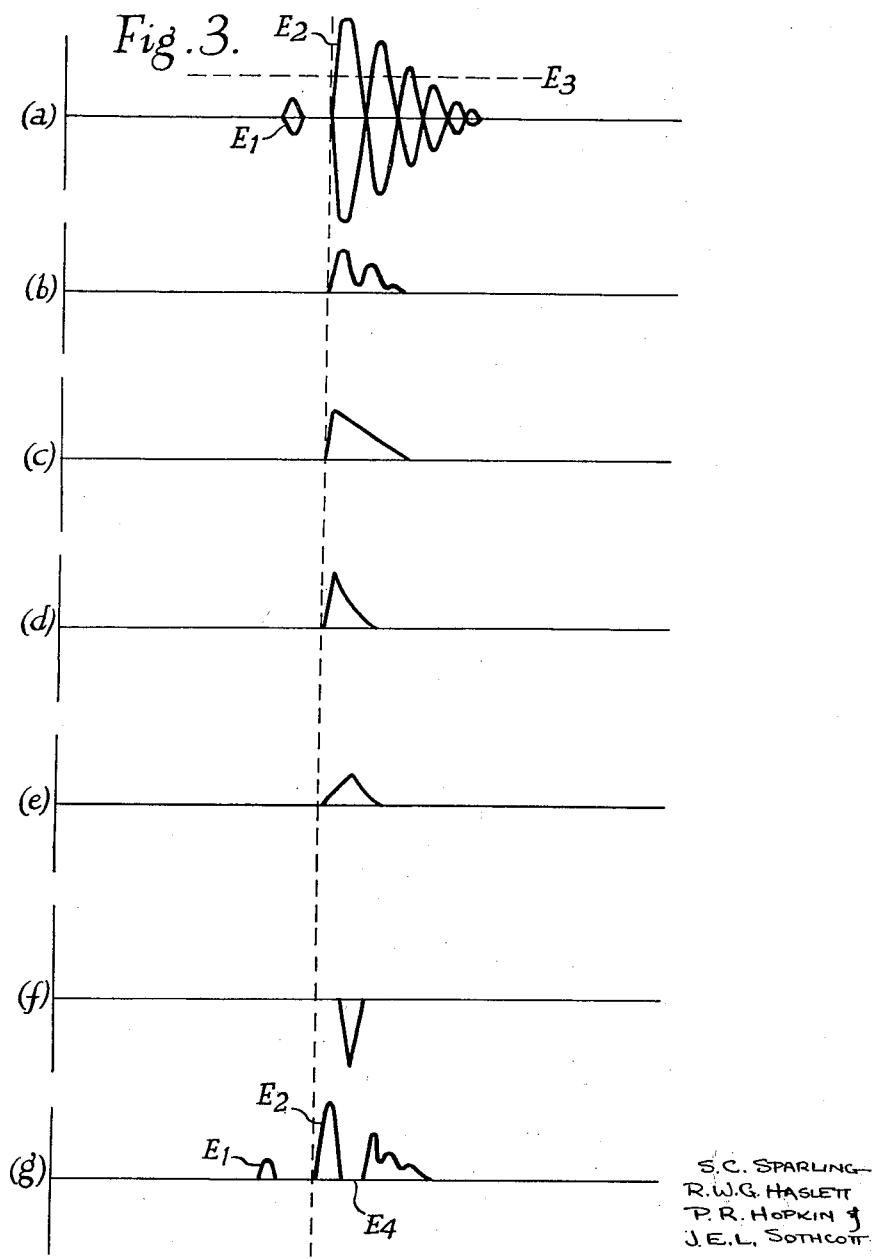

S.C. SPARLING
R.W.G. HASLETT
P.R. HOPKIN &
J.E.L. SOTHCOTT
INVENTORS

BY Moore & Hall
ATTORNEYS

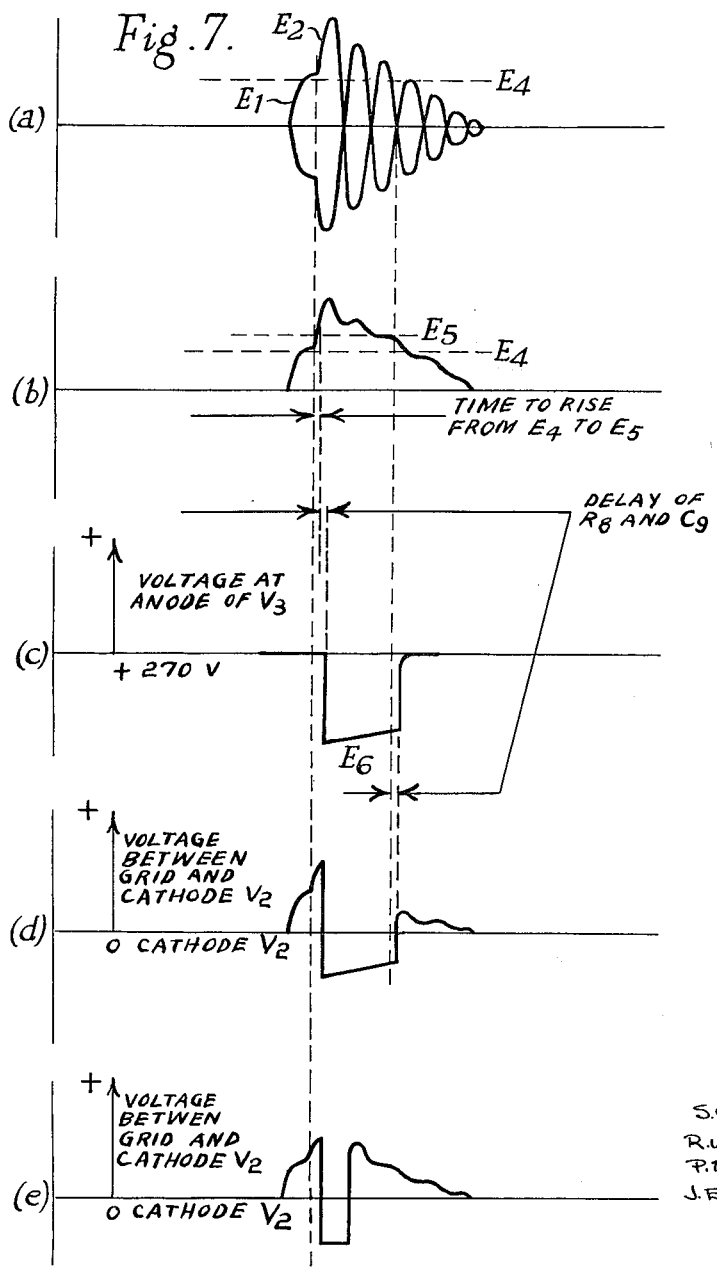

United States Patent Office 3,098,210
Patented July 16, 1963

3,098,210
ECHO RANGING WITH REFERENCE TO BOUNDARY CONDITIONS
Stanley Capel Sparling, Roy William George Haslett, Peter Roy Hopkin, and John Ernest Leon Sothcott, Barkingside, England, assignors to Kelvin & Hughes Limited, Glasgow, Scotland, a British company
Filed Apr. 26, 1957, Ser. No. 655,212
Claims priority, application Great Britain May 1, 1956
8 Claims. (Cl. 340—3)

The present invention relates to ultrasonic echo-sounding systems for the detection of fish in the sea in which exploring signals in the form of pulses or short wave trains are emitted from a transmitter into the sea, the exploring signals being reflected relatively weakly by fish in the path of the exploring signals and relatively strongly by the sea bed to provide echo signals which are received and applied to display means for indicating the reception of echo signals. In this specification the term display means includes recording means.

In the operation of such systems there is usually a long drawn out boundary or bottom echo from the sea bed due to the width of the transmitting beam, irregularities in the boundary and inter-reflections between various parts of the boundary or between parts of the boundary and objects lying near to it. It is frequently found that in the display, the echoes from fish near the boundary are either partially obscured by the echoes from the boundary itself or merge with the boundary echo and in some cases it is not easy to detect the presence of such fish in the display as the echoes from them are not distinguishable from the boundary echo displayed on the record and appear as part of that echo. This difficulty is aggravated by the over-loading of an amplifier in the receiver and the saturation of the recorder by echoes from the boundary and from objects near the boundary.

In the case of fish lying close to or on the sea bed, the fish echo often appears on the display joined to the echo from the sea bed, hereinafter referred to as the bottom echo. It is then extremely difficult to tell whether a variation in this bottom echo display is due to variations in the sea bed or to fish lying near the sea bed. In addition, because of the vertical motion of the ship on account of waves, the sea bed is not displayed on the record as a sounding of constant depth. For example in an electrochemical recorder the sea bed is not shown as a straight line parallel with the direction of motion of the paper, but is subject to variations due to the vertical motion of the ship, and on an electrochemical recorder chart the bottom echo record may be of roughly sine-wave form.

It is an object of this invention to provide an improved system of the type referred to adapted to provide a display in which the presence of fish lying near to the sea bed can more readily be detected than hitherto. The invention comprises indexing means providing a guide, pointer, or indicator which is an index of or indicates a directing sign, a guide or data reading of desired information in a quantitative sense.

According to the present invention a system of the type specified comprises indexing means for providing in the display of the indications of boundary echoes an index whereby the position of the leading edge in the display of each boundary echo can be determined, the indexing means including a circuit responsive to the reception of the leading edges solely of boundary echoes to vary the display abruptly at an instant fixedly related to the instant of reception of the leading edge of each boundary echo. The abrupt variation in the display can be arranged to occur at the leading edge or any suitable time thereafter.

The indexing means and the nature of the abrupt variation in the display can take various forms. In a preferred embodiment of the invention the said circuit in the indexing means comprises an interrupter adapted to interrupt the display of received boundary echoes and means responsive to the leading edges solely of received boundary echoes for actuating the interrupter. In this embodiment the interruption must occur after at least the leading edge has been displayed.

It is a principal purpose of the invention to provide a novel fish finder able effectively to distinguish fish close to the sea bottom under conditions in which the fish echo is merged with the leading edge of the sea bottom echo, by providing a suitable display on which the leading edge of the bottom echo is shown and the major portion of the bottom echo is blocked out, leaving the fish echoes standing out as conspicuous irregularities in the leading edge of the bottom echo as displayed on the display device. To achieve this effect it is important that at least a portion of the leading edge of the bottom echo, larger than any fish echo, appear as a line or band on the display, otherwise there is no reference or index to enable a viewer to interpret the display with consistency or reliability and against which the depth of the fish displayed could be readily determined. Assurance that at least part of the leading edge of the bottom echo, unmistakably identifiable as such, appears on the display as a reference from which the fish echos may be said to project like a sore thumb and be readily identified as fish echoes, is obtained by delayed blanking out a major part of the bottom echo. The delay in blanking out part of the bottom echo is arranged to be such that a line of sufficient width and amplitude as to be readily identifiable as the bottom echo is always produced on the display. This is achieved by a fixed delay or "indexing means" which becomes operable at a predetermined voltage value or level of the bottom echo signal which is larger than the signal representative of the larges fish echoes. This predetermined value is independent of the full amplitude of the bottom echo. After the beginning of the bottom echo there is a short period, depending upon the steepness of the leading edge of the bottom echo, which may be termed the "time to rise" of the bottom echo to the predetermined voltage value. This time is too short to assure that a portion of the leading edge of the bottom echo will appear on the display if the blanking out were operative immediately upon the bottom echo signal reaching the predetermined value. Accordingly a fixed delay, comprising for example a suitable condenser and resistance, is placed in the circuit, so that the blanking out of the bottom echo does not remove the leading edge thereof and a sufficient portion of this leading edge remains on the display as a line or band to act as an index, which is essential to a determination from the display of the presence of fish close to the sea bed. A sea bottom with good reflecting properties will yield a bottom echo signal with a sharp rise which will be blanked out by the blanking pulse unless some delay in addition to that inherent in the "time to rise" of the bottom echo is built into the circuit.

Figure 6:
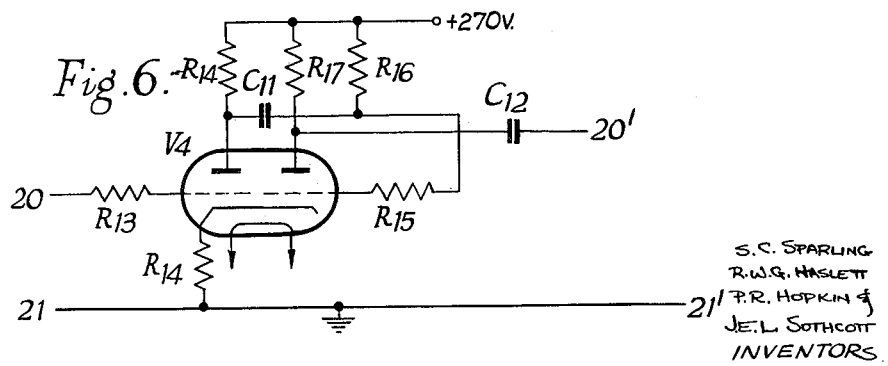

The invention will now be described, by way of example, with reference to the accompanying drawings, in which:

FIG. 1 is a block circuit diagram showing the receiving section of an echo sounder of known type, FIG. 2 is a block circuit diagram of one embodiment of the invention, FIG. 3 is a diagram showing the waveforms of signals at various points in the diagram of FIG. 2, FIG. 4 is a block circuit diagram showing the receiving section of another echo sounder of known type, FIG. 5 is a circuit diagram of part of another embodiment of the invention, FIG. 6 is a circuit diagram showing a modification to the circuit shown in FIG. 5, and FIG. 7 is a diagram showing the waveform of signals at various points of the circuits shown in FIGS. 5 and 6.

In the embodiments to be described apparatus for the detection of fish comprises a transmitting unit in which a short pulse is generated and applied to a transmitting transducer which is under water. Echoes from fish and from the sea bed are picked up on a receiving transducer (which may, if desired, be part of a common transmitting-receiving transducer or may be a separate transducer), are amplified and are applied to a pen recorder.

In these embodiments the display is effected on a recorder of the type in which a stylus moves across the recording chart in a direction representing time and hence range whilst the paper moves at right angles to the direction of motion of the stylus. Signals received from the same range are recorded by successive strokes of the pen and appear on the chart closely side by side or overlapping, thus forming a continuous line or band in the direction of motion of the paper.

It is arranged that recording of each bottom echo is interrupted for a predetermined period beginning at a short fixed time after the leading edge of each bottom echo, that is to say short compared with the duration of the bottom echo. The bottom echo is usually a long echo with a steep leading edge but a gradual falling off towards the end. The effect of this interruption in recording appears in the bottom echo records as a white band parallel with the leading edges of the bottom echoes so that these echoes are, in fact, recorded in two sections and appear as a narrow band separated from a broad band by this white band. In the narrow band the band boundaries are close together and it is thus much easier to identify echoes from fish lying near the sea bed as these will be displayed as slight irregularities in the leading edge of the bottom echoes but not in the white band.

Alternatively, it may be arranged that the period of interruption is as long as or longer than the period of the remainder of the bottom echo and in this case recording of the bottom echo will not be resumed. When this practice is adopted the bottom echo will appear on the recorder chart as a narrow black band only, but the presence of objects lying on or near the bottom will be detected in the same way, that is to say by a thickening of the black band.

In these embodiments of the invention the output of one stage of the receiving amplifier is divided into two parts, the high frequency signals from one of these parts being rectified and passed by an amplitude gate which is adjusted to pass only the upper portion of the bottom echo (which is larger than the fish echo from the same exploring pulse). The initial rise of the bottom echo is slightly delayed and is applied to generate a short pulse which is used to close a gate through which the other of the said parts of the output passes before being applied to the pen-recorder. The effect of this is to produce on the chart a narrow black line, of width determined by the amount by which the initial rise of the bottom echo is delayed, separated from the rest of the bottom echo trace by a white line of width determined by the width of the short pulse.

The receiving section of a known echo-sounder, as shown in FIG. 1, comprises a receiving transducer $M_1$ feeding an amplifier which has three amplifying stages $A_1$, $A_2$ and $A_3$ followed by a rectifying stage $X_1$. The output from the rectifying stage $X_1$ is applied to a pen recorder $W_1$.

The first stage, $A_1$, is a gain-controlled stage and is fed with a suppression control voltage of variable decay time which is adjusted in such a manner that the bottom echo gives the largest signal output, which fully saturates the pen-recorder.

In the modification of this circuit shown in FIG. 2 the amplifying stage $A_3$ is gated and is arranged to pass no signal when a gating pulse is applied to it from a further amplifier $A_4$.

Normally all signals pass through the amplifying stage $A_3$ and are displayed on the display device. The only time the amplifying stage $A_3$ is gated is after the leading edge of a boundary echo and hence all echoes from fish are duly indicated on the display device.

The output of the second stage $A_2$ is split, part being applied to the third stage $A_3$ and part to a detector $X_2$, the output from which is passed through an integrating circuit $I_1$, a differentiating circuit $J_1$, a second integrating circuit $I_2$, to the amplifier $A_4$. A pre-set steady amplitude gating voltage is also fed into the detector from a voltage source $G_1$ so that the high-frequency signal from the amplifier $A_2$ has to exceed this pre-set voltage before the rectifier $X_2$ conducts.

Thus, referring to FIG. 3, if the output from the first stage $A_1$ is as shown at $(a)$ the output from the detector $X_2$ is as shown at $(b)$. Whilst the waveform shown at $(a)$ represents the envelope of a modulated high-frequency carrier, the waveforms shown at $(b)$ and subsequently represent actual pulse waveforms. In these diagrams the ordinates represent potential and the abscissae time. The potential scales of each diagram bear no relation to one another. In the waveform shown at $(a)$ $E_1$ is a small fish echo and the large oscillating echo is the bottom echo with a steep initial rise $E_2$. The level $E_3$ is the level below which the amplitude-gating voltage fed into the detector $X_2$ allows no signal to pass. The fish echo $E_1$ as shown is readily distinguished from the bottom echo. This apparatus however can provide an unambiguous indication of a fish echo even if it merges with the bottom echo provided it does not rise above the level $E_3$. This level may be made adjustable by providing a control knob 50 for the circuit $G_1$.

The integrating circuit $I_1$ has a short time constant, so that its effect is to smooth out the envelope of the pulse shown at $(b)$, producing at its output the pulse shown at $(c)$. The differentiating circuit $J_1$ shortens this pulse, producing the pulse shown at $(d)$.

The second integrating circuit $I_2$ has a long time constant so that it delays the initial rise of the pulse shown at $(d)$, producing the pulse shown at $(e)$. The upper portion of this pulse is amplified and inverted in phase by the amplifier $A_4$ and applied to gate the amplifier $A_3$. The amplified and inverted pulse is shown at $(f)$.

The output from the rectifying stage $X_1$ is thus as shown at $(g)$, a portion $E_4$ of the bottom echo having been suppressed by the gated amplifier $A_3$.

Thus the gated amplifier $A_3$ constitutes an interrupter which interrupts the display of the received boundary echoes and which is actuated by the circuit $G_1$, $X_2$, $I_1$, $J_1$, $I_2$ and $A_4$, comprising means responsive to the leading edges solely of received boundary echoes, the whole constituting indexing means. In this embodiment the abrupt variation in the displays is an abrupt variation from black to white in the trace. The threshold voltage is set entirely in the side chain $G_1$, $X_2$, $I_1$, $J_1$, $I_2$ and $A_4$ which is used to provide the gating voltage. Thus, the threshold voltage does not appear in the main chain $M_1$, $A_1$, $A_2$, $A_3$, $X_1$, $W_1$.

In the receiving section of another known echo-sounder shown in FIG. 4, a transducer $M_1$ is connected through a network $N_1$, two amplifying stages $A_5$ and $A_6$, a voltage-doubling rectifying stage $X_3$ and an output amplifier $A_7$ to pen-recorder $W_1$. Reference is made to page 553, FIG. 11–6(a) of "Radio Engineering" by Terman, McGraw-Hill, 3rd edition 1951 in connection with voltage-doubling rectifying stage $X_3$. In this echo sounder the transducer $M_1$ is used as a transmitting and a receiving transducer and the network $N_1$ is common both to the receiving section and the transmitting section (not otherwise shown) of the echo sounder.

In FIG. 5 part of the amplifying stage $A_6$, the rectifying stage $X_3$, and the output amplifier $A_7$ of FIG. 4 are shown in more detail. The portion of the circuit within the dotted enclosure constitutes the modification necessary to carry the invention into effect in this embodiment.

Thus, the amplifying stage $A_6$ comprises a valve $V_1$ with an anode load consisting of the primary winding of a transformer $S_1$ tuned by a capacitor $C_1$ in parallel with the winding. The anode load is connected to a source of high-tension plate or anode voltage, shown as +270 v. at the top of FIG. 5, through a resistor $R_1$ and to earth through a capacitor $C_2$. The resistor $R_1$ and the capacitor $C_2$ constitute a decoupling network of the valve $V_1$.

The anode of the valve $V_1$ is connected through a capacitor $C_3$ to the cathode of a rectifier $X_4$ (that is to the plate or electrode by which a conventional current leaves the rectifier) and to the anode of a rectifier $X_6$. A resistor $R_3$ is connected between the anode of the rectifier $X_4$ and the cathode of the rectifier $X_6$ and with the rectifiers constitutes a voltage-doubling network. The cathode of the rectifier $X_6$ is connected to the control grid of a pentode valve $V_2$ through a resistor $R_4$. The pentode $V_2$ is the amplifying valve of the output amplifier $A_7$ of FIG. 4. The resistor $R_4$, a capacitor $C_4$ in parallel with the resistor $R_3$ and a capacitor $C_6$ connected between the control grid and the cathode of the pentode $V_2$ constitute a filter network. A large A.C. decoupling capacitor $C_5$ is connected between the anode of the rectifier $X_4$ and the cathode of the pentode $V_2$.

The valve $V_2$ has an anode load resistor $R_5$ and two cathode load resistors $R_6$ and $R_7$ in series, shunted with a capacitor $C_7$. A terminal $T_1$ connected to the cathode of the valve $V_2$ provides an output to the recorder.

The anode of the rectifier $X_4$ is connected through a rectifier $X_5$ poled to conduct in the same direction as the rectifier $X_4$ and a large resistor $R_2$ in parallel with the rectifier $X_5$ to the movable contact of a switch $P_2$. One fixed contact of the switch $P_2$ is connected to the junction of the resistors $R_6$ and $R_7$, and the other fixed contact is connected to a source of potential of −30 volts. For an electro-chemical recorder the output required from the terminal $T_1$ depends on whether wet paper or dry paper is used. The rectifier $X_5$ and the resistor $R_2$ are connected to the source of potential of −30 volts when wet paper is used and to the junction of the resistor $R_6$ and $R_7$ when dry paper is used. This junction is at a potential of approximately +60 volts. Furthermore a switch $P_1$ is provided to short out the resistor $R_5$ when dry paper is being used.

Referring to FIG. 7 a signal at the anode of $V_1$ is shown at (a). The steep leading edge of the bottom echo is shown at $E_2$ as in FIG. 3(a) but here the fish echo $E_1$ is represented as large and of sufficient amplitude to saturate the chart of the recorder, and is merging with the bottom echo. The level at which the recorder chart is saturated is shown by the dotted line $E_4$.

The signal applied to the grid of the valve $V_2$ is shown at (b), when the circuit within the dotted enclosure in FIG. 5 is not present or is switched off. Such a signal produces a trace on the recorder from which it is very difficult to tell whether a shoal of fish is present or not.

Waveform 7(c) represents the voltage at the anode of $V_3$ with an initial level at plus 220 volts, the positive voltage being in the upward direction. There is an initial small delay equal to the time of rise of the level $E_4$ to level $E_5$, followed by a delay introduced by the action of $R_8$ and $C_9$. The waveform back edge shows the additional delay by $R_8$ and $C_9$ after waveform 7(h) falls below the level $E_5$. The level of horizontal lines seen in waveforms 7(d) and 7(e) represents the level of the cathode of $V_2$. In both these diagrams the vertical coordinate shows the voltage between the control grid and the cathode of $V_2$.

Referring now to the circuit within the dotted enclosure in FIG. 5 a further output from the valve $V_1$ is fed through a capacitor $C_8$ and a resistor $R_8$ of large resistance to the control grid of a pentode valve $V_3$ connected so as to operate as a triode, that is with its suppressor grid and cathode connected together, and with its screen grid and anode connected together. A rectifier $X_7$ connected between the junction of the capacitor $C_8$ and the resistor $R_8$ and earth conducts during the negative-going portion of the signal from the anode of the valve $V_1$ and hence the signal applied to the control grid of the pentode $V_3$ is again as shown in FIG. 7(b).

The control grid of the pentode $V_3$ is also connected to earth through a capacitor $C_9$ and the anode is connected to the high-tension anode supply through a load resistor $R_9$. The cathode of the pentode $V_3$ is connected to earth through a resistor $R_{10}$ and to the high-tension supply through a resistor $R_{11}$. Resistors $R_{10}$ and $R_{11}$ constitute a potential divider biasing the cathode of the pentode $V_3$ to approximately +60 volts.

Thus a large positive potential must be applied to the control grid of the pentode $V_3$ in order to render the pentode conducting. In FIG. 7(b) only signals above the dotted line $E_5$ will render the pentode conducting.

The anode of the pentode $V_3$ is connected to the control grid of the pentode $V_2$ through a capacitor $C_{10}$ and a rectifier $X_9$ in series, connected so as to allow only negative-going signals to be applied to the control grid of the pentode $V_2$ from the anode of the pentode $V_3$. Positive-going signals from the anode of the pentode $V_3$ are short-circuited to the cathode of the pentode $V_2$ through a rectifier $X_8$ connected between the junction of the capacitor $C_{10}$ and the rectifier $X_9$ and the cathode of the pentode $V_2$.

Thus when the signal provided at the anode of the pentode $V_1$ rises above the level $E_5$ in FIG. 7(b) the pentode $V_3$ is rendered conducting and the potential at the anode of the pentode $V_3$ falls to a level $E_6$ (FIG. 7(c)). The anode of the pentode $V_3$ remains substantially at this level $E_6$ until the waveform shown at (b) falls below the level $E_5$. The anode then recovers with a time constant $C_{10}$ $(R_9+R_4+R_3+R_2)$ so that the signal applied from the anode of the pentode $V_3$ to the control grid of the pentode $V_2$ is as shown in FIG. 7(c). The time constant $C_{10}$ $(R_9+R_4+R_3+R_2)$ is fairly short but the voltage applied to the grid of the pentode $V_2$ is prevented from rising above the zero line (FIG. 7(c)) by the rectifier $X_8$. The net signal applied to the control grid of the pentode $V_2$ is the sum of the signals shown in FIG. 7(c) and FIG. 7(b). This signal is shown in FIG. 7(d).

In this circuit the leading edge of the signal shown in FIG. 7(c) is delayed from the beginning of the bottom echo by the grid circuit of the pentode $V_3$, the resistor $R_8$ and the capacitor $C_9$ acting as an integrating circuit.

In this simple circuit, however, the length of time for which the pentode $V_3$ is conducting is dependent on the amplitude of the bottom echo. This means that while the initial black line on a chart is of constant width, the white line is of varying width. If it is required that the white line is also of constant width the circuit shown in FIG. 5 may be modified by breaking the circuit at 20, 20', 21, 21' and inserting the circuit shown in FIG. 6.

The signal appearing at the junction of the resistor $R_8$ and the capacitor $C_9$ is now fed to the control grid of the left-hand side (in the drawing) of a double triode valve $V_4$. The double triode has a common cathode connected to earth through a resistor $R_{14}$. Normally the right-hand side of the double triode is conducting and hence this resistor biases the cathode of the double triode and determines the level $E_5$ in FIG. 7(b).

The anode of the left-hand side of the double triode $V_4$ is connected to the high-tension anode supply through a load resistor $R_{14}$ and to the control grid of the right-hand side of the double triode $V_4$ through a capacitor $C_{11}$ and a resistor $R_{15}$ in series. A resistor $R_{16}$ is connected between the junction of the capacitor $C_{11}$ and the resistor $R_{15}$ and the high-tension supply. The right hand anode of the double triode $V_4$ is connected to the high-tension anode supply through a load resistor $R_{17}$ and to the control grid of the pentode $V_3$ through a capacitor $C_{12}$.

The double triode $V_4$ functions as a flip-flop circuit and normally the right-hand side is conducting. When a signal of sufficient magnitude is applied to the control grid of the left-hand side, this side is rendered conducting. The flip-flop then resets itself with a time constant dependent on the product $C_{11}R_{16}$.

Thus a rectangular positive-going pulse is applied to the control grid of the pentode $V_3$ and the output from the anode of this pentode is a rectangular negative-going pulse. The signal now applied to the control grid of the pentode $V_2$ is as shown in FIG. 7(e). This results in a white line of constant width and having a sharply defined trailing edge as well as a sharply defined leading edge. Although the FIGURE 7(d) shows the major part of the bottom echo as blanked out according to a presently preferred form of the invention, it will be understood that all that is actually necessary is the blanking out of a part sufficient to make the leading edge of the bottom echo clearly identifiable by setting it off from the remainder of the bottom echo. In FIGURE 3(g), for example, only a sufficient part of the bottom echo is blanked out to make the leading edge clearly identifiable as such. The adjustment of the preset voltage level at which the display is interrupted by the blanking pulse affects the width of the leading edge of the bottom echo appearing in the display. As this display width of the leading edge is narrowed to approach a line, the contrast with the fish echoes will increase and they will stand out with increasing contrast as obvious irregularities on the narrowed leading edge. The variation in contrast arises from the contrasting widths of the fish echoes and the leading edge of the bottom echo in the display. Thus, increase in contrast can be obtained with the same intensity of display signals.

Although embodiments have been described in which the abrupt variation in the display of each boundary echo signal is a variation in trace intensity it will be understood that other form of abrupt variation may be used to provide the index. For example, it may be arranged that the recording pen gives a lateral kick on in the instant of reception of the leading edge of each boundary echo signal, or a predetermined time thereafter. This form requires, of course, that the line records in the trace be spaced adequately to display the steps so formed to constitute the index.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Echo ranging apparatus for the location of fish in the sea, comprising a transmitter for transmitting pulsed exploring signals into the sea, a receiving transducer adapted to produce electric signals in response to echo signals resulting from the reflection of the exploring signals by fish in the sea and by the sea bed, electric amplifying means connected to said receiving transducer to amplify said electric signals and comprising a gated stage capable of being rendered non-conducting upon the application of a suitable electric control pulse thereto, a display device adapted to display the output signals from the electric amplifying means in relation to time, an electric control pulse generator, circuit means for applying said electric signals as input signals to said generator, said generator producing an electric control pulse when the amplitude of said electric signals exceeds a predetermined value, the said predetermined value being so chosen that it is exceeded only by a signal value corresponding to the receipt of a sea bed echo, said generator having delay means such that the initiation of said control pulse has a predetermined time delay in relation to the commencement of the sea bed echo, circuit means for applying said electric control pulse to said gated stage, so that the display of received signals is inhibited for a predetermined time period commencing subsequently to the commencement of the sea bed echo to ensure the display of at least a portion of the leading edge of the bottom echo of greater amplitude than the display of fish echoes before said interruption occurs, so as to provide an index such that fish echoes merged with said bottom echo stand out and can be readily detected by the irregularities they produce in the leading edge of the bottom echo as displayed on said display device.

2. Apparatus as claimed in claim 1 in which the electric control pulse generator comprises a biased detector to which the signals from the receiving transducer are applied, the said detector thus only producing an output if the said signals exceed a predetermined value, and the output from the detector providing the electric control pulse.

3. Apparatus as claimed in claim 1, and means to control said predetermined value of said electric signals which triggers said electric control pulse.

4. Apparatus as claimed in claim 1, said electric control pulse generator comprising a detector to which the signals from the receiving transducer are applied, and a biased amplifier connected to receive the output of the detector, said amplifier thus only producing an output if the said signals exceed said predetermined value, the output from the amplifier providing the electric control pulse.

5. Apparatus as claimed in claim 1 in which the electric control pulse generator comprises a detector connected to receive the signals from the receiving transducer and a monostable, flip-flop circuit connected to receive the output of the detector, the said monostable circuit being triggered to generate an output pulse only if the output from the detector exceeds said predetermined value, the output of the monostable circuit providing the electric control pulse, said display means being a pen recorder.

6. In ultrasonic echo-sounding for fish in the sea, the method of distinguishing echoes from fish close to the sea bottom in the presence of the bottom echo which comprises displaying the echo signals on a time base, interrupting the display of the bottom echo signal at a fixed time after the leading edge of the bottom echo signal in response to the bottom echo signal exceeding a pre-set level, said fixed time being such to assure that at least a portion of the leading edge of said bottom echo of greater amplitude than said fish echoes is displayed to provide an index such that fish echoes merged with said bottom echo stand out as irregularities from said leading edge and observing the irregularities of the displayed leading edge of the bottom echo signal in relation to the interruption in the display, said irregularities resulting from fish echo signals joined to the bottom echo signal.

7. The combination set forth in claim 6, the step of adjusting said pre-set level to vary the contrast of said fish echoes with repsect to the leading edge of said bottom echo.

8. Apparatus as claimed in claim 1, said delay means comprising a resistance and condenser connected as an integrating circuit.

References Cited in the file of this patent

UNITED STATES PATENTS

| | | |
|---|---|---|
| 2,333,688 | Shepard | Nov. 9, 1943 |
| 2,400,309 | Kock | May 14, 1946 |
| 2,502,938 | Fryklund | Apr. 4, 1950 |
| 2,539,553 | Rich | Jan. 30, 1951 |
| 2,656,531 | Atlas | Oct. 30, 1953 |
| 2,786,993 | Reid | Mar. 26, 1957 |
| 2,853,824 | Schutz | Sept. 30, 1958 |
| 2,859,437 | Atlas | Nov. 4, 1958 |
| 2,861,254 | Abrams | Nov. 18, 1958 |